United States Patent Office 2,768,905
Patented Oct. 30, 1956

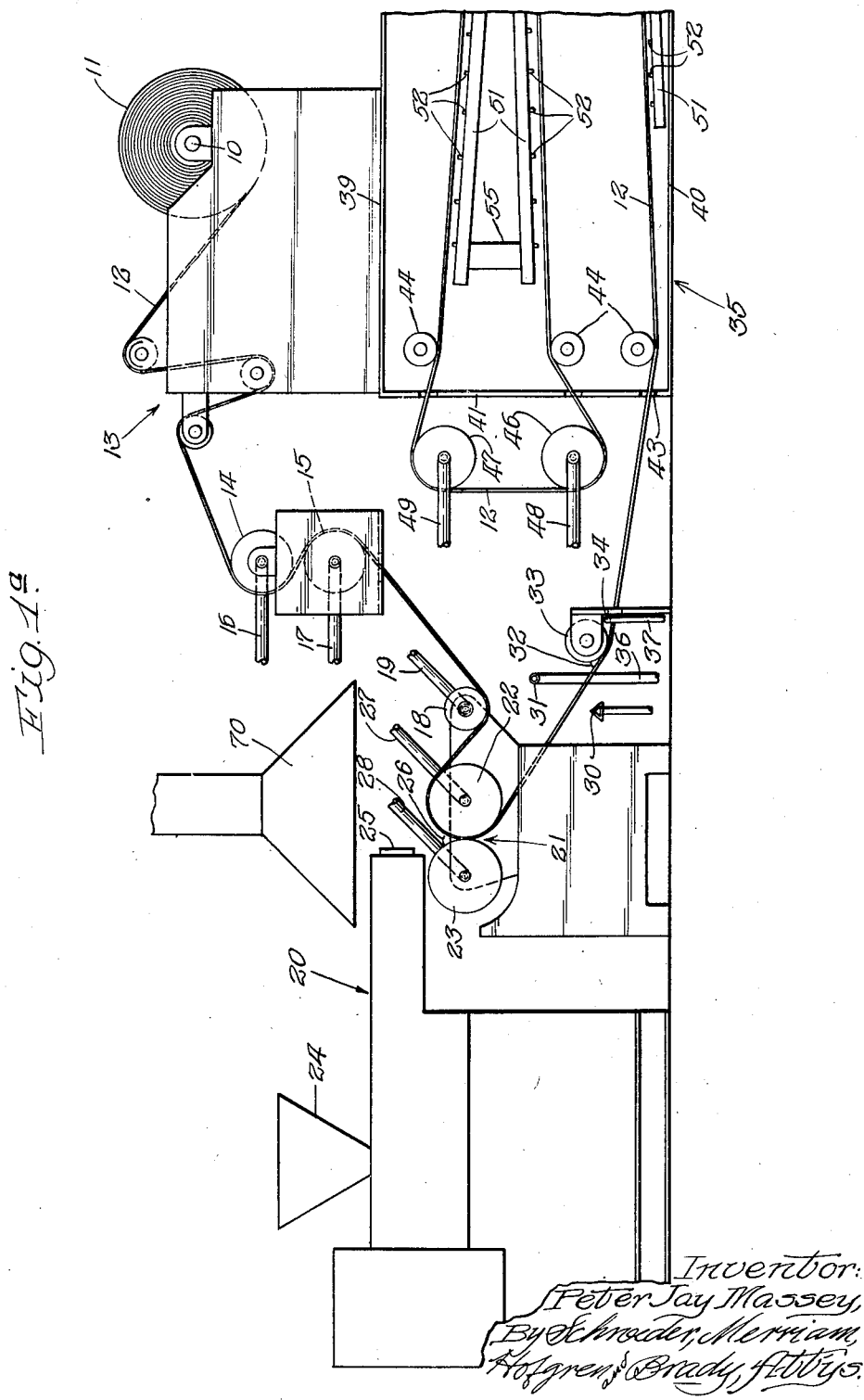

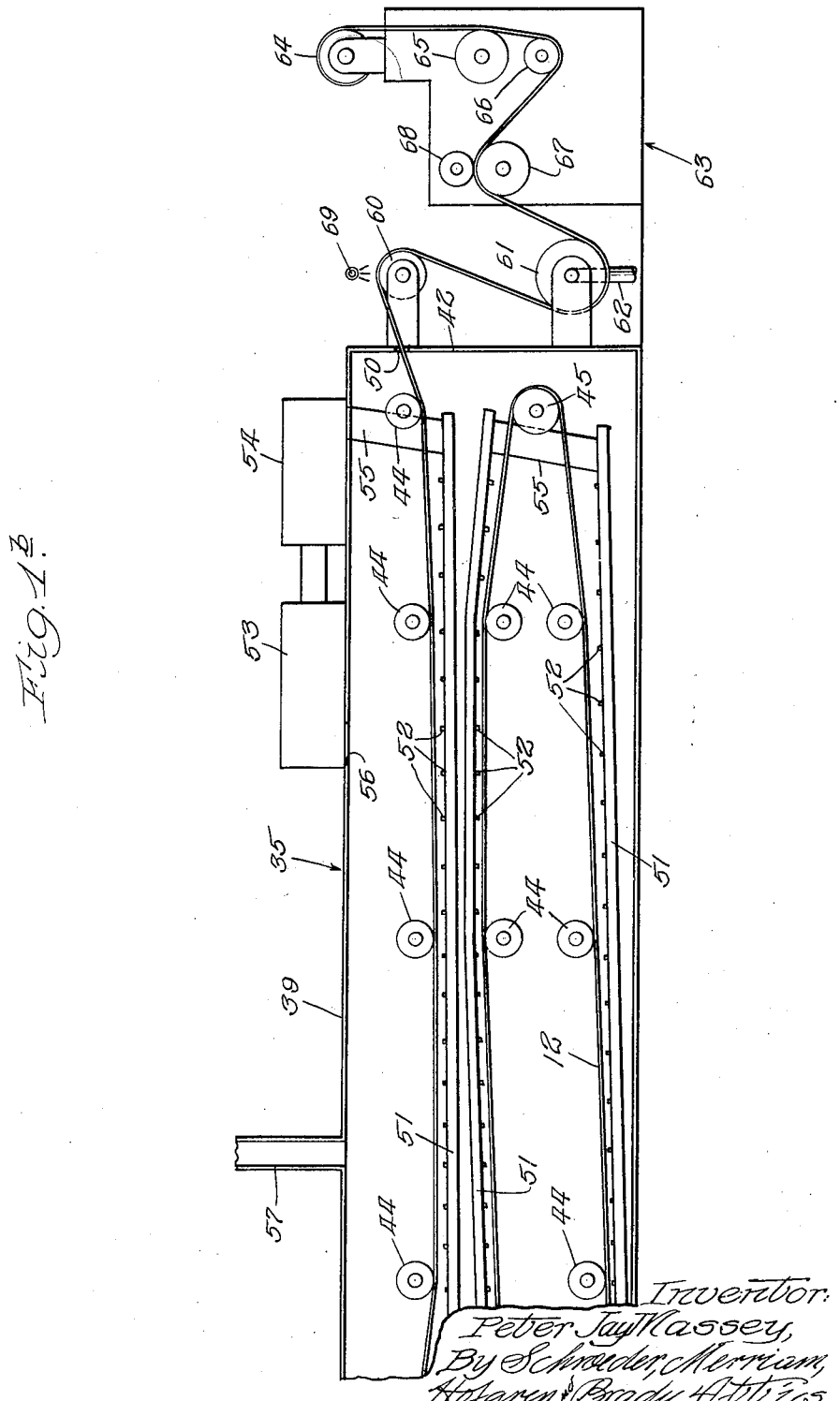

2,768,905

METHODS FOR TREATING COPOLYMERS OF VINYLIDENE CHLORIDE AND COATING WEBS THEREWITH

Peter Jay Massey, River Forest, Ill.

Application June 16, 1951, Serial No. 231,994

7 Claims. (Cl. 117—60)

This invention relates to methods for treating thermoplastic material and methods for producing films therefrom.

It is the general object of this invention to produce a new method and apparatus for treating films of thermoplastic material and to produce new and useful products resulting from such treatment.

High molecular weight thermoplastic materials, such as polyethylene, vinyl resins and saran, possess many unique and useful properties. Thus, for example, these materials exhibit a considerable degree of resistance to penetration by liquids and water vapor and are substantially unaffected by many chemicals. One of the most useful ways of utilizing the materials is to prepare them in the form of a thin film laminated to a flexible web, such as cloth or paper. In such form the resulting product is ideal barrier material for the wrapping of food stuff, machinery and the like and when so used serve very efficiently as protective barrier coverings easily heat sealed for perfect closure.

High molecular weight vinylidene chloride materials, such as shown in United States Patent No. 2,160,931, are commonly known as saran, and for the purpose of simplicity will be referred to by that name.

It has been the common practice to prepare films of such materials by extruding them under heat and pressure from the common screw-type extruder. As this type of apparatus produces a film many times thicker than that ultimately desired, it has been necessary to reduce the thickness of the film by stretching. Thus, it is necessary to quench the extruded film in cold water substantially immediately as it leaves the die head in order to prevent the material from crystallizing. After quenching, the material is stretched until it has reached the desired thickness whereupon it may be used simply as such film or may be laminated to paper and the like to produce a sturdier wrapping material. Such stretching of the extruded film orients the molecules of the material in the direction of the stretch and thus the resulting film either alone or laminated to a flexible base exhibits what is known as "memory," the desire for the film to return to the dimensions it was originally extruded. This causes an undesired tendency to curl or pucker when heat sealed as well as lower the tear resistance in one direction.

These materials crystallize very slowly at room temperature, but very rapidly within certain elevated temperature ranges. Thus, for example, saran crystallizes most rapidly at temperatures between 190° and 200° F. Polyethylene crystallizes most rapidly between 160° and 180° F. In the prior methods outlined above it is necessary immediately to reduce the temperature of the materials well below their optimum crystallization temperature in order that they may be stretched to the desired thickness. The resulting film, either alone or when laminated to a web, ultimately crystallizes slowly and nonuniformly throughout the film, and the curling tendency and decreased resistance to tear previously noted remains inherent therein.

The materials with which this invention is primarily concerned are organic polymers which have extraordinary viscosity, and have such viscosity throughout the working temperature range of the material. The common gravity flow viscometers do not even measure such viscosities within their working range, and it has been necessary to use relatively new measuring instruments which are known as "plastometers." The claims, therefore, refer to these materials as plastometric, and the term as so used means a product having a viscosity beyond the ordinary range of gravity flow viscometers throughout the range of temperature at which the material may be handled. This range is referred to as the "working temperature range."

In my copending applications Serial No. 182,516, filed August 31, 1950, now U. S. Patent 2,712,508, and Serial No. 213,728, filed March 3, 1951, now abandoned, I have disclosed a new process for producing thin films of thermoplastic materials without the necessity of stretching the film. This is accomplished by producing a film on the exit side of the nip formed between a rapidly rotating roll and a substantially stationary roll. The film so produced is of the desired ultimate thickness and may be laminated directly or indirectly to paper or used by itself as a film. This process produces films of such materials in which the molecules are completely unoriented, and thus the film remains flat without curling upon application of heat and the tear resistance is equal in all directions.

When the apparatus and method disclosed in my copending applications are employed to produce a film, and particularly where the material is saran, the stationary roll, which acts in the nature of a doctor, sometimes produces minute surface irregularities in the form of scratches and pinholes. The scratches, while detracting from the appearance of the film, do not detract from their usefulness as normally they do not extend completely through the film. Pinholes, on the other hand, while minute in character often extend through the film and hence form tiny areas of permeability. I have discovered that all such surface defects may be removed by exposing the surface of the film to intense heat. The application of the heat is so regulated and limited as to raise the temperature of the surface of the film to cause it to "flow" and thus to eliminate surface defects. Some high molecular weight thermoplastic materials, of which saran is the outstanding example, are extremely poor conductors of heat, and thus it is possible to raise the temperature of one side of even a very thin film without substantially increasing the temperature of the other side of the film in order to accomplish the desired result.

The films of high molecular weight thermoplastic material with which this invention is concerned contain plasticizers and stabilizers. These films should not be confused with coating compositions which include as an ingredient one or more of such thermoplastic materials together with waxes, solvents or the like. Such compositions become liquid at comparatively low temperatures so that coatings of such compositions may be applied by the usual methods, such as dipping and the like. Even at the high temperatures employed in the process of this invention the materials with which applicant is dealing are extremely heavy and viscous; their viscosity varies between 7,000 and 12,000 poises at 356° F.

As noted above, the thermoplastic materials dealt with here contain plasticizers and stabilizers. These are necessary rather than desired ingredients. The primary purpose of the plasticizer is to produce a material which may be worked within useable temperature ranges. The omission of plasticizers would require that excessive temperatures be used in order to produce a mass which could be worked at all, and at excessive temperatures these thermoplastic materials oxidize rapidly. Plasticizers detract from the resistant qualities of the materials in which they are incorporated. I have discovered that the sudden application of intense heat hereinbefore described not only smoothes the surface of the film but also drives off a large proportion of the plasticizer from the surface. Because of the high insulating qualities of the material the heat, when applied for a short period of time only, does not fully penetrate to the interior of the film and thus the plasticizer is driven off primarily from the surface. This produces a surface of marked increased resistance to penetration by fluids and vapors and marked resistance to attack by chemicals and the like.

Inasmuch as the film emerging from the exit side of the film forming nip is of the desired thickness it need not be stretched thereafter. To produce uniform crystallization I then maintain the temperature within its optimum crystallization temperature range for the period necessary to produce substantially complete crystallization throughout the film. Thus, the film is crystallized uniformly, both as to time and as to degree, and, as previously noted, the crystals themselves are substantially unoriented and hence the film exhibits no tendency to curl or pucker when heat sealed.

The optimum crystallization temperature for saran is between 190° and 200° F. at which temperature the film will crystallize in approximately 22 seconds. For high molecular weight polyethylene the optimum temperature range is between 160° and 180° F., and the crystallization time is approximately 50 to 60% of that required for saran. Vinyl and other high molecular weight resins lie generally between the saran and polyethylene requirements.

The apparatus of this invention is designed to produce the results above described and is shown somewhat schematically in the accompanying drawings, in which:

Fig. 1a is a plan view showing the details of the film forming and laminating and of the apparatus; and Fig. 1b is a plan view of the balance of the apparatus, the two figures when placed side by side illustrating the complete machine.

While my invention is susceptible of embodiment in many different forms, I have shown in the drawings and will herein describe in detail one specific embodiment of the method and the product resulting therefrom, with the understanding that the present disclosure is to be considered as an exemplification of the principles of the invention and is not intended to limit the invention to the embodiment illustrated. The scope of the invention will be pointed out in the appended claims.

Referring now to the drawings, the apparatus includes means 10 for rotatably supporting a roll 11 of the material to be coated. While the process of this invention may be used in the coating of many types of flexible webs, such as cloth, foil, and the like, the apparatus is disclosed as employed in the coating of a paper web. The paper web 12 is unwound from the roll over the idler and tensioning rollers generally indicated at 13 and a pair of preheat rollers 14 and 15. Means in the form of steam lines 16 and 17 are employed for heating the rolls 14 and 15 respectively, the steam being furnished at approximately 100 lbs. to produce a roll temperature of 320° F. From the first pair of preheat rollers the web is led to a third preheat roller 18 heated by the steam line 19 to a temperature of approximately 345° F. so as to produce a temperature of the paper prior to the coating or laminating operation of about 320° F.

A conventional screw-type extruder 20 is employed to deliver thermoplastic material in heated and workable state into the nip 21 formed between a downwardly rotating roll 22 and a substantially stationary doctor roll 23. The extruder is designed to heat the material in the absence of air to prevent oxidation. The material may be fed into a hopper 24 and extruded from a die head 25 and forms a rotating window shade-like pool of material in the nip. Each of the rolls 22 and 23 are rifled and are provided with conduits 27 and 28, respectively, to supply heated oil to the interior of the rolls to maintain the rolls at the desired temperature. When operated with saran, the material is extruded from the die head 25 at a temperature between 335° and 340° F. The doctor roll 23 is maintained generally at a temperature between 295° and 305° F. This temperature is not measured at the point of contact with the saran where it must be assumed to be considerably hotter. The paper carrying roll 22 is maintained at a temperature between 330° and 335° F.

As noted in my copending applications, the material 26 in the nip is subjected to extreme working, so great in fact as to raise its temperature approximately 10° F. over the temperature at which it was supplied to the nip and in excess of the temperature of either of the rolls 22 and 23. Thus, with the temperatures previously noted the temperature of the saran 26 in the nip is approximately 345° to 350° F.

The action of the rotating pool 26 is like a gear in that it tends to rotate the roll 23 in the same direction as the rotation of the roll 22. Because of this fact the greatest working and substantially the entire shear is between the pool 26 and the surface of the roll 23. At this point on the roll 23 the temperature of the roll in contact with the pool is in excess of the temperature of the roll itself and is higher than the temperature of the paper web as it contacts the pool and therefore the shear takes place along the surface of the roll 23, leaving a thin film of desired thickness on the web 12. The thickness may be regulated by adjusting the pressure between the rolls 22 and 23, the pressure being of a resilient nature, such as fluid pressure in order to accomplish the coating. Spring pressure does not lend itself well to this operation.

From the nip 21 the coated web is led over a source of heat 30, which may take the form of that type of gas flame known as infra-red, to apply to the exterior surface of the thermoplastic film a sudden intense heat. The size of the flame and its distance from the surface of the film may be adjusted as the operation requires although I have found that a flame 1½ inches wide burning at about 1100° to 1500° F. placed at a distance of approximately 2 inches from the surface of the film to be correct for saran, where the speed of the web is about 170 feet per minute. In any event, the heat is applied rapidly to raise the temperature of the surface of the film to over 400° F. Preferably the flame is so adjusted to raise the temperature of the surface of the film to between 440° and 540° F. The sudden application of this heat serves not only to drive the plasticizer from the surface of the film, but also eliminates surface defects, such as scratches and pinholes, in the coating. Inasmuch as the web 12 is moving rapidly as it passes over the flame, the application of heat is of short duration, so short in fact that the temperature of the side of the paper opposite to the flame remains about 350° F.

Immediately after the application of the flame, a first water spray 31 is applied to the paper side of the web. The water forms a pool 32 at the point where the web meets a guide roller 33, the excess water draining off from the sides of the web. A second water spray 34 is applied to the web immediately prior to the time the web enters the crystallization oven 35. Suitable water pipe lines 36 and 37 are provided for supplying water at tap temperature to the spray nozzle devices 31 and 34.

Some high molecular weight thermoplastic materials, including saran, shrink during the period between the time they are applied to the web and when they are finally wound up on the windup reel. When the web is of paper, the purpose of the spray is to saturate the web and thus render it capable of changing its dimensions. As the saran shrinks the paper is free to shrink with it. Because of this no internal stresses are set up between the paper and the coating, and furthermore any resulting tendencies to curl are avoided.

The oven 35 comprises an elongated chamber having a top 39 and bottom 40 and sides joining the top and bottom and connected to end walls 41 and 42, the end wall 41 being provided with a suitable slot 43 through which the web enters the oven. Located in the oven are a number of guide rolls, all indicated as 44.

The coated web 12 enters the oven through the notch 43, passes along the lowermost guide rolls 44 and around a roll 45 which reverses the direction of travel of the web in the oven. The paper side, rather than the coated side, of the web contacts the rolls 44 and 45. Just outside the entrance end of the oven there is provided two chill rolls 46 and 47, each provided with suitable pipe lines 48 and 49 respectively, to introduce a coolant into the interior of each roll. Inasmuch as the coated side of the web contacts the face of each of these rolls, their construction is such as to prevent sticking of the thermoplastic material as the web passes around the rolls. It has been discovered that if the rolls 46 and 47 are chilled, such as by tap water, there is formed on the surface of the rolls, which is metal, a thin film of moisture which condenses thereon. Thus, in effect, each of the rolls 46 and 47 is provided with a liquid surface to which the coating will not stick.

After passing around the rolls 46 and 47, the web re-enters the oven and passes along the idler rolls 44 and out through a slot 50 at the exit end of the oven, again with the coated side of the web being away from and out of contact with the upper idler rolls.

Means are provided for maintaining the coated film at its optimum crystallization temperature as it passes through the oven 35. In the embodiment of the invention illustrated, a plurality of hot air ducts 51 extend longitudinally through the oven and are provided with a plurality of slot-like openings 52 through which hot air is directed against the coated face of the web. An air pump 53 is provided for exhausting air from the interior of the oven and delivering it to an air heater 54. The heated air is led into each of the ducts 51 through a series of connecting ducts 55. The pump 53 draws air from the oven through an opening 56 to maintain the oven under a slight vacuum yet permitting the lighter gases to escape from a vent 57. The heater 54 is designed to maintain the air temperature between 220° and 250° F. and maintain the oven temperature between 180° and 200° F., the optimum crystallization temperature for saran.

The size of the oven and the circuitous path of the coated web therethrough is determined by the speed of the entire apparatus to permit the coated web to remain in the oven for the time sufficient to effect complete crystallization. For saran this time is approximately 22 seconds. Thus, for a machine speed of 150 feet per minute the oven is approximately 20 feet long so that the path of the paper is approximately 60 feet long, giving the required time dwell in the oven.

From the oven the web is led around a guide roll 60 and a chill roll 61 chilled by tap water through the pipe means 62 and thence through the winding apparatus 63. The chill roll 61 immediately ahead of the winder is to insure reducing the temperature of the coating well below its tacky point to prevent the possibility of "blocking" in the roll, that is, to prevent the coating from sticking to underlying sections of the web when it is wound. This winding apparatus includes a takeup reel 64, guide rolls 65, 66 and a pair of keeper rolls 67 and 68. This latter pair of rolls serves not only to guide the web to the roll 66 but, because the pair form a nip, a change of takeup reels 64 may be made as required without danger of interrupting the feed of the web through the oven.

If desired, an additional spray 69 may be provided to rewet the web as it leaves the oven and just before it enters the winding apparatus to bring the web to any final desired moisture content.

Means (not shown) are provided for driving the rolls of the apparatus at the speed of the web to lead the web through the coating device and the oven. The stationary roll 23 may be permitted by a ratchet device or the like to rotate very slowly and additional means may be provided to clean the back surface of the roll constantly to present a cleaned surface of the doctor to the nip 21.

As previously noted, the infra-red gas flame serves among other things to drive off the plasticizer from the surface of the film. Vapors of the plasticizer are quite visible at this point. Because of the nature of the plasticizers it is desirable to provide a hood 70 connected to an exhaust system to remove the vapors from the area of the apparatus.

Suitable adjustments should be provided for the gas flame so that it may be raised and lowered closer to or farther away from the web and the size of the flame may be regulated to produce the desired results. If the flame is too close to the web or if the web is run too slowly so that the application of the heat is too intense or too prolonged, bubbles form in the film which deleteriously affect its properties.

I claim:

1. The method for treating a copolymer of vinylidene chloride which comprises heating the copolymer in the absense of air to its softening point, introducing the hot softened copolymer into a nip formed between a rotating roll and a substantially stationary roll to extrude a hot thin film of copolymer from the exit side of the nip and then passing the film while still hot through a zone heated to the optimum crystallization temperature of the copolymer and maintaining the film in said zone for a period to accomplish substantially complete crystallization thereof.

2. The method of claim 1 in which said zone is heated to a temperature of the order of 190° to 200° F.

3. The method of claim 1 in which said period is at least about 22 seconds.

4. The method of claim 1 in which said zone is heated to a temperature of the order of 190° to 200° F. and said period is at least about 22 seconds.

5. The method for treating a plastometric copolymer of vinylidene chloride which comprises heating the copolymer to a temperature of the order of 335° to 340° F., introducing the heated copolymer into a nip formed between a rotating roll and a substantially stationary roll to extrude a hot film of copolymer from the exit side of the nip, maintaining the temperature of the rotating roll substantially between 330° and 335° F. and maintaining the temperature of the stationary roll substantially between 295° and 305° F., flash heating one surface of the hot extruded film to a temperature approximately between 440° and 540° F., and then passing the film while still hot through a zone heated substantially to between 190° and 200° F., and maintaining the film in said zone for a period of at least about 22 seconds.

6. The method for treating a plastometric copolymer of vinylidene chloride which comprises heating the copolymer to approximately 335° to 340° F. in the absence of air, introducing the heated copolymer into an extrusion nip formed between a rotating roll and a substantially stationary roll to extrude film of copolymer from the exit side of the nip, maintaining the rotating roll at a temperature of approximately 330° to 335° F. and maintaining the stationary roll at a temperature between 295° and 305° F., heating a flexible web to a temperature substantially in excess of the boiling point of water, passing the heated web around the rotating roll to apply the film thereto in the form of a coating, flash heating the surface of the hot film to approximately 440° to 540° F., passing the coated web while still hot through a zone maintained at a temperature between 190° and 200° F. and maintaining the coated web in said zone for at least about 22 seconds to accomplish substantially complete crystallization of the film.

7. The method for treating a thin film of a plastometric copolymer of vinylidene chloride formed from a mass of the copolymer bonded to a flexible web at temperatures of the order of 300° to 350° F. which comprises passing the still hot film through a first heating zone rapidly to heat the surface of the film to a temperature of the order of 440° to 540° F. without substantially increasing the temperature of the web, then passing the hot film into a second heating zone to maintain the temperature of the film between 190° and 200° F. and maintaining the film at such temperature until crystallization of the copolymer is substantially complete.

References Cited in the file of this patent

UNITED STATES PATENTS

| | | |
|---|---|---|
| 2,054,115 | Abrams | Sept. 15, 1936 |
| 2,117,200 | Miller | May 10, 1938 |
| 2,329,571 | Wiley | Sept. 14, 1943 |
| 2,340,834 | Hanson | Feb. 1, 1944 |
| 2,396,946 | Grupe | Mar. 19, 1946 |
| 2,412,429 | Slingluff et al. | Dec. 10, 1946 |
| 2,491,923 | Johnson | Dec. 20, 1949 |
| 2,633,434 | Tanner | Mar. 31, 1953 |

FOREIGN PATENTS

| | | |
|---|---|---|
| 600,687 | Great Britain | Apr. 15, 1948 |

OTHER REFERENCES

Plastics World, March 1951, p. 23, Flame Polishing.

Plastics World, February 1951, p. 30, Flame Polishing Plastics.